(12) United States Patent
Okuda et al.

(10) Patent No.: US 8,258,726 B2
(45) Date of Patent: Sep. 4, 2012

(54) BATTERY COOLING SYSTEM FOR VEHICLE

(75) Inventors: Jun Okuda, Toyohashi (JP); Toshiaki Nakanishi, Toyohashi (JP); Norihito Yuno, Hamamatsu (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 424 days.

(21) Appl. No.: 12/700,627

(22) Filed: Feb. 4, 2010

(65) Prior Publication Data
US 2010/0225264 A1 Sep. 9, 2010

(30) Foreign Application Priority Data
Mar. 4, 2009 (JP) ................................ 2009-050251

(51) Int. Cl.
*H02P 7/00* (2006.01)
(52) U.S. Cl. ........ 318/268; 318/473; 318/139; 318/277; 318/276; 318/275; 320/153; 320/158; 320/150; 236/49.1; 236/67; 361/694; 361/695; 361/696; 454/69; 454/70; 454/103
(58) Field of Classification Search .................. 361/694, 361/695, 696; 318/139, 268, 277, 276, 275; 320/150, 153, 158; 62/239, 407, 265; 454/69, 454/70, 103
See application file for complete search history.

(56) References Cited

U.S. PATENT DOCUMENTS

| | | | | |
|---|---|---|---|---|
| 5,771,476 A * | 6/1998 | Mufford et al. | ................. | 701/22 |
| 5,937,664 A * | 8/1999 | Matsuno et al. | ............. | 62/259.2 |
| 6,138,466 A * | 10/2000 | Lake et al. | ....................... | 62/199 |
| 6,912,353 B2 * | 6/2005 | Nelson et al. | ................. | 388/825 |
| 7,024,871 B2 * | 4/2006 | Zhu et al. | ......................... | 62/133 |
| 7,348,741 B2 * | 3/2008 | Minekawa et al. | ........... | 318/268 |
| 7,924,562 B2 * | 4/2011 | Soma et al. | .................... | 361/694 |
| 2005/0168180 A1 | 8/2005 | Minekawa | | |

FOREIGN PATENT DOCUMENTS

| JP | 10-306722 A | 11/1998 |
|---|---|---|
| JP | 2004-48981 A | 2/2004 |

\* cited by examiner

*Primary Examiner* — Rita Leykin
(74) *Attorney, Agent, or Firm* — Christensen O'Connor Johnson Kindness PLLC (57) ABSTRACT

A system for cooling a battery mounted on a vehicle using air within a vehicle, independently of the travelling state of the vehicle. The air within a vehicle compartment is guided to a battery mounted on a vehicle to cool the battery. A controller determines a basic fan speed v of the cooling fan based on a battery temperature and an ambient temperature. Further, the controller calculates an increment $\Delta v$ of the fan speed in accordance with the vehicle speed and the degree of window opening and determines a final fan speed V according to $V = v + \Delta v$, to drive the cooling fan. By controlling the fan speed to increase, it is possible to cool the battery even when the base pressure of the inlet-side static pressure of the cooling fan becomes negative pressure compared to when the windows are closed.

7 Claims, 5 Drawing Sheets

BATTERY COOLING SYSTEM FOR VEHICLE

PRIORITY INFORMATION

This application claims priority to Japanese Patent Application No. 2009-050251, filed on Mar. 4, 2009, which is incorporated herein by reference in its entirety.

BACKGROUND

1. Technical Field

The present invention relates to a battery cooling system for a vehicle, and more specifically to a cooling system for a battery mounted on an electric vehicle, a hybrid electric vehicle, and other vehicles, which use an electric motor as a drive source.

2. Related Art

Batteries for supplying electric power to an electric motor serving as a drive source in electric vehicles, hybrid electric vehicles, and so on suffer from not only deterioration of performance but also a reduction of product life when the temperature thereof rises. In order to deal with these disadvantages, a system for directing the air in a vehicle compartment which is conditioned by an air conditioner to a battery chamber by means of a cooling fan to thereby cool a battery has conventionally been proposed.

Figure 6:
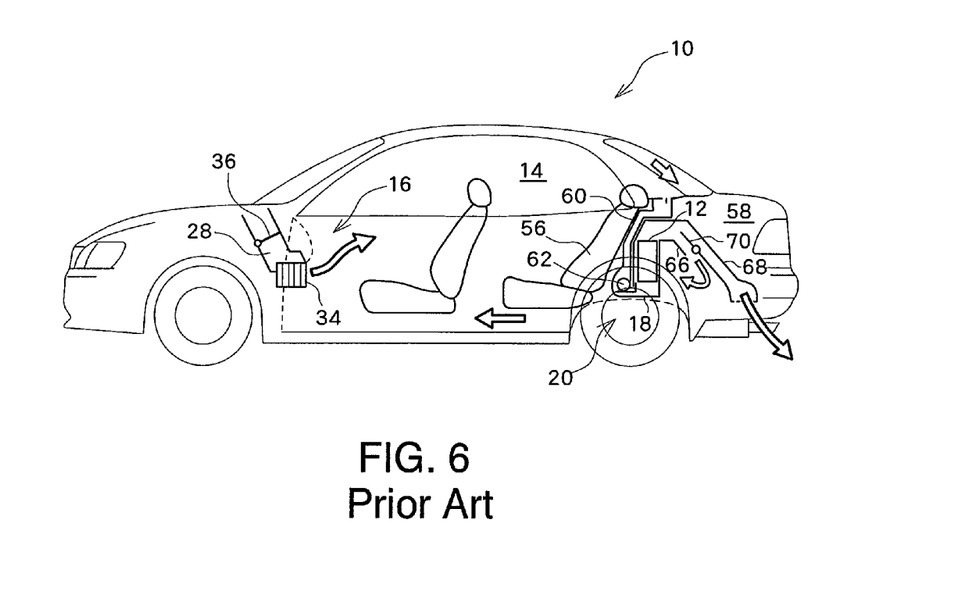
FIG. 6 is a diagram illustrating a conventional system structure.

FIG. 6 illustrates a structure of a battery cooling system for a vehicle which is disclosed in JP 10-306722 A. A vehicle 10 includes a battery 12 installed therein for driving an electric motor, and an air conditioner 16 for air-conditioning the interior of a vehicle compartment 14. The battery 12 is disposed within a battery chamber 18 in which a cooling device 20 is also provided. The air conditioner 16 includes a compressor or an evaporator, and the evaporator is provided within an air conditioning duct 28. In the air-conditioning duct 28, a blower fan 34 is provided as an air blower means between the evaporator and an air inlet port, and a switching damper 36 which opens or closes the air inlet port is provided near the air inlet port. On the other hand, the battery chamber 18 is provided in a space between a rear seat back 56 and a trunk 58. One end of a cooling duct 60 having the other end opened to the interior of the vehicle compartment 14 is coupled to the battery chamber 18. A cooling fan 62 is provided within the cooling duct 60, and the conditioned air within the vehicle compartment 14 is supplied as cooling air to the interior of the battery chamber 18 by means of driving the fan motor. One end of a circulation duct 66 and one end of an exhaust duct 68 are coupled on the side of the battery chamber 18 opposite to the cooling duct 60 with the battery 12 being interposed therebetween. The other end of the circulation duct 66 communicates with the vehicle compartment 14 via the trunk 58, and the other end of the exhaust duct 68 is opened to the outside of the vehicle. A switching damper 70 is further provided between the circulation duct 66 and the exhaust duct 68, and the battery chamber 18.

The battery 12 provided within the battery chamber 18 is cooled by the air supplied from the vehicle compartment 14 by the cooling fan 62. The air, after cooling the battery 12, is returned to the vehicle compartment 14 via the circulation duct 66 in a state in which the exhaust duct 68 is closed by the switching damper 70 and is exhausted to the outside of the vehicle via the exhaust duct 68 in a state in which the circulation duct 66 is closed by the switching damper 70.

Further, JP 2004-48981 A describes control of the operation mode of a fan which cools a battery installed in a vehicle in accordance with the noise in the vehicle compartment. More specifically, JP 2004-48981 A describes that it is possible to effectively cool the battery installed in a vehicle while reducing the sensory noise sensed by a passenger of the vehicle by controlling the rotation speed of the fan at a low speed when the vehicle compartment is quiet and controlling the rotation speed of the fan at a high speed when the vehicle compartment is noisy.

As described above, when the air within the vehicle compartment 14 is directed to the battery chamber 18 by means of the cooling fan 62 to cool the battery 12, it may be difficult to effectively cool the battery 12 depending on the travelling state of the vehicle 10. Specifically, if the vehicle 10 is travelling at a certain speed with the windows of the vehicle 10 being opened, the base pressure of the inlet-side static pressure of the cooling fan 62 becomes negative pressure compared to that when the windows are closed, in accordance with the degree of window opening and the vehicle speed, and the air quantity for cooling by the cooling fan 62 is reduced. Also, when the cooling fan 62 is stopped or rotates at a low speed, there is a possibility of backflow of the air outside of the vehicle through the exhaust duct 68 in a state in which the circulation duct 66 is closed by the switching damper 70.

SUMMARY

The present invention provides a system which is capable of effectively cooling a battery installed in a vehicle irrespectively of the travelling state of the vehicle.

In accordance with an aspect of the invention, there is provided a battery cooling system for a vehicle for cooling a battery mounted on a vehicle, the system including a cooling fan which supplies air within a vehicle compartment to the battery; and a controller which controls a fan speed of the cooling fan, the controller changing the fan speed in accordance with an amount of change of a base pressure of an inlet-side static pressure of the cooling fan.

According to one embodiment of the present invention, the controller controls the fan speed such that when the base pressure of the inlet-side static pressure of the cooling fan is negative pressure compared to that obtained when windows are closed, the fan speed is increased by a greater amount than when the base pressure of the inlet-side static pressure of the cooling fan is not negative pressure compared to that obtained when windows are closed.

According to another embodiment of the present invention, the controller changes the fan speed in accordance with a vehicle speed and a degree of window opening of the vehicle.

According to still another embodiment of the present invention, the controller controls the fan speed of the cooling fan such that as the vehicle speed is increased and as the degree of window opening is increased, the fan speed is increased.

According to a further embodiment of the present invention, the controller calculates the fan speed by adding an increment $\Delta v$ of the fan speed in accordance with the vehicle speed and the degree of window opening to a basic fan speed which is determined in accordance with the battery temperature of the battery.

According to the present invention, even when the base pressure of the inlet-side static pressure of the cooling fan becomes negative pressure with respect to the pressure obtained when windows are closed due to the traveling state of the vehicle, the fan speed of the cooling fan can be changed accordingly. It is therefore possible to effectively cool the battery mounted on the vehicle using the air within the vehicle compartment.

BRIEF DESCRIPTION OF THE DRAWINGS

A preferred embodiment of the present invention will be described in detail with reference to the following figures, wherein.

DETAILED DESCRIPTION

A preferred embodiment of the present invention will be described in detail with reference to the accompanying drawings.

Figure 1:
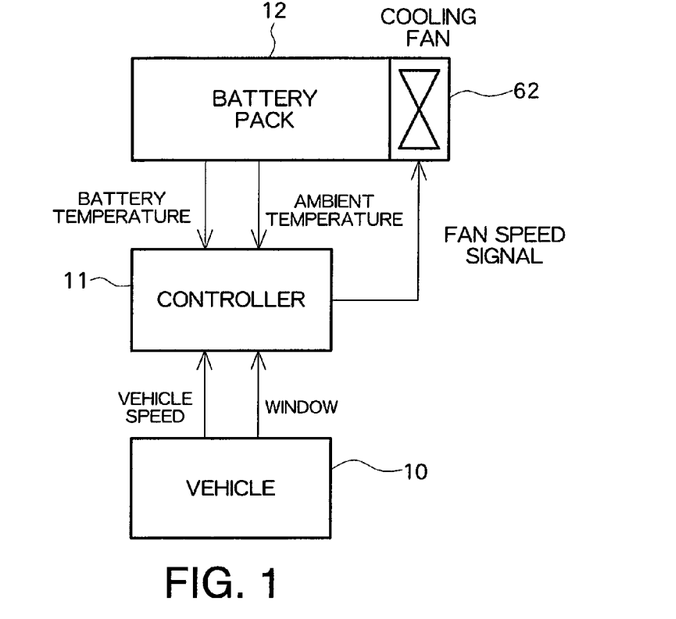
FIG. 1 is a diagram illustrating a system structure according to an embodiment of the invention.

FIG. 1 illustrates a structure of a battery cooling system according to an embodiment of the present invention. As in FIG. 6, a battery (battery pack) 12 is mounted on a vehicle 10 such as an electric vehicle and a hybrid electric vehicle. The battery 12 is disposed within a battery chamber 18 provided in a space between a rear seat back 56 and a trunk 58. While the battery 12 is generally a secondary battery such as a nickel-metal hydride battery or a lithium ion battery, it may be a fuel cell. One end of a cooling duct 60 having the other end opened to a vehicle compartment is coupled to the battery chamber 18. A cooling fan 62 (which will be also referred to as an "air blower" as necessary) is provided in the cooling duct 60, and, due to drive of a fan motor, the conditioned air within the vehicle compartment is supplied to the interior of the battery chamber 18 as cooling air. The drive of the cooling fan 62 is controlled by a controller 11. One end of a circulation duct 66 and one end of an exhaust duct 68 may be coupled to the battery chamber 18 on the side opposite to the cooling duct 60 with the battery 12 being interposed therebetween, as illustrated in FIG. 6. The other end of the circulation duct 66 communicates with the interior of the trunk 58, and the other end of the exhaust duct 68 is opened to the outside of the vehicle. A switching damper 70 is provided between the circulation duct 66 and the exhaust duct 68, and the battery chamber 18. Of these structural components, only the vehicle 10, the controller 11, the battery 12, and the cooling fan 62, which are essential sections, are illustrated in FIG. 1.

The controller 11 is composed of a microcomputer. The battery temperature and the ambient temperature are supplied to the controller 11 from temperature sensors provided in and near the battery 12, respectively. The controller 11, based on the battery temperature and the ambient temperature which are supplied, determines a basic fan speed v of the cooling fan 62. On the other hand, a vehicle speed and a degree of window opening are supplied to the controller 11 from a vehicle speed sensor and a window open/close sensor provided on the vehicle 10, respectively. The controller 11, based on these data items, determines an increment $\Delta v$ of the fan speed. The controller 11 then adds the basic fan speed v and the increment $\Delta v$ together to compute the fan speed V from $V=v+\Delta v$, and supplies the fan speed V, as a fan speed signal, to the fan motor of the cooling fan 62.

The cooling fan 62 is driven based on the fan speed signal supplied from the controller 11 to direct the conditioned air within the vehicle compartment 14 to the battery chamber 18 for cooling the battery 12. Concerning the fan speed expressed by $V=v+\Delta v$, the first term of the right side is a fan speed which is determined by the battery temperature and the ambient temperature, and the air quantity is therefore set in accordance with the battery temperature and the ambient temperature. Further, the second term of the right side is an adjusting speed which is determined by the vehicle speed and the degree of window opening, and the air quantity is therefore set in accordance with the vehicle speed and the degree of window opening.

As described above, depending on the speed and the degree of window opening of the vehicle 10, the base pressure of the inlet-side static pressure of the cooling fan 62, i.e. the air pressure near the inlet side, becomes negative with respect to the pressure obtained when the windows are closed, and, on the condition that the fan speed (power) of the cooling fan 62 is the same, the quantity of cold air of the cooling fan 62 is reduced. (Hereinafter, the expression "the vehicle compartment 14 is negative pressure" refers to the base pressure of the inlet-side static pressure of the cooling fan 62 being reduced compared to that obtained when the windows are closed.) Therefore, according to the present embodiment, by adjusting the fan speed of the cooling fan 62 with an adjustment amount $\Delta v$ in accordance with the vehicle speed and the degree of window opening to thereby compensate for the air quantity which is reduced by the negative pressure, the battery 12 is cooled reliably independently of the travelling state of the vehicle 10.

While any method may be adopted for controlling the speed of the cooling fan 62 by the controller 11, when the speed of the cooling fan 62 is controlled in a continuous manner with a duty ratio which is a ratio with respect to the maximum value, for example, the fan speed is controlled in units of 1% (the minimum control unit) based on the control information. Alternatively, when the speed of the cooling fan 62 is controlled stepwise, the fan speed is preset in three, five, or seven stages, for example, and the optimal speed is selected based on the control information.

Further, when determining the adjustment amount $\Delta v$, the adjustment amount $\Delta v$ is determined so as to maintain the target air quantity of the cooling fan 62 or so as to ensure the target air quantity±tolerance. When determining the adjustment amount $\Delta v$ so as to maintain the target air quantity of the cooling fan 62, the fan speed which compensates for a shortage of the air quantity caused by the negative pressure within the vehicle compartment 14 due to the vehicle speed and the degree of window opening is computed and a difference between the fan speed thus obtained and the current fan speed is added as an increment to the current fan speed. The shortage of the air quantity caused by the negative pressure can be previously measured and stored in a memory of the controller 11 as a map. More specifically, the shortage of the air quantity or a compensating air quantity can be defined as a two-dimensional function of the vehicle speed and the degree of window opening. Examples of a two dimensional function or a two dimensional map will be described below. This method is applicable to both the continuous control and the stepwise control described above. When determining the adjustment amount $\Delta v$ so as to ensure the target air quantity±tolerance of the cooling fan 62, on the other hand, whether or not the shortage of the air quantity caused by the negative pressure within the vehicle compartment 14 due to the vehicle speed and the degree of window opening exceeds a threshold level is determined, and when the shortage of the air quantity exceeds the threshold level, a fan speed which is several stages higher than the current fan speed is set. The shortage of the air quantity caused by the negative pressure can be previously measured and stored as a map in the memory of the controller 11 as described above. The shortage of the air quantity in accordance with the current vehicle speed and the degree of window opening, and the threshold value, are determined with reference to the map, and then the two values are compared with each other to determine whether or not the shortage of the air quantity exceeds the threshold level. Then, when the shortage of the air quantity exceeds the threshold level, a fan speed which is one stage higher than the current fan speed, for example, is set. In the case of switching the fan speed in five stages, when the current fan speed is in the third stage, for example, the fan speed is switched to the fourth stage which is one stage higher. This method is applicable to the stepwise control described above. It is also possible to set the fan speed to a fan speed which is higher than the current fan speed by an amount of stages corresponding to the difference between the shortage of the air quantity determined as a two dimensional function of the vehicle speed and the degree of window opening, and the threshold level.

Figure 7:
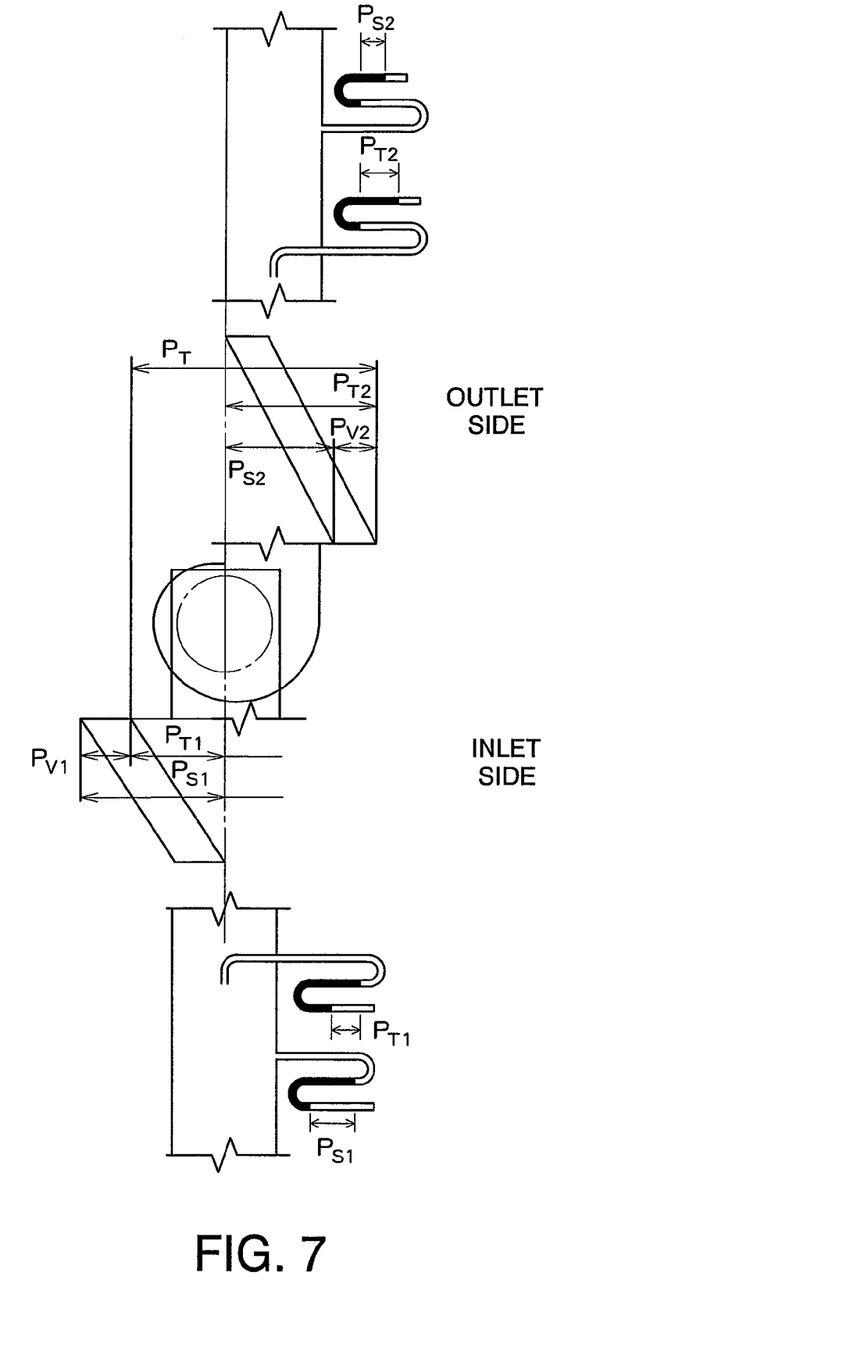
FIG. 7 is an explanatory view illustrating the pressure of an air blower.

Here, the pressure of a blower generally includes a fan total pressure and a fan static pressure. The fan total pressure refers to an increment provided by a fan and is represented by a difference between the total pressure at the outlet of the fan and the total pressure at the inlet of the fan. The fan static pressure is a result obtained by subtracting the dynamic pressure at the fan outlet from the fan total pressure. The relationship of these pressures is illustrated in FIG. 7 and represented by the following equation. In the present embodiment, when the windows are opened, the base pressure of the static pressure at the inlet side of the cooling fan 62 (air pressure near the inlet side) is lowered (becomes negative pressure compared to when the windows are closed), which results in an increase of the total pressure at the inlet side $P_{T1}$ toward the negative side. Consequently, the total pressure $P_T$ of the cooling fan increases, and the air quantity is reduced when the power of the cooling fan remains the same.

$$P_T = P_{T2} - P_{T1} = (P_{S2} + P_{V2}) - (P_{S1} + P_{V1})$$
$$= (P_{S2} - P_{S1}) + (P_{V2} - P_{V1})$$

wherein $P_T$ is total pressure of the fan; $P_{T2}$ is total pressure at the fan outlet side; $P_{T1}$ is total pressure at the fan inlet side; $P_{S2}$ is static pressure at the fan outlet side; $P_{S1}$ is static pressure at the fan inlet side; $P_{V2}$ is dynamic pressure at the fan outlet side; and $P_{V1}$ is dynamic pressure at the fan inlet side.

Figure 2:
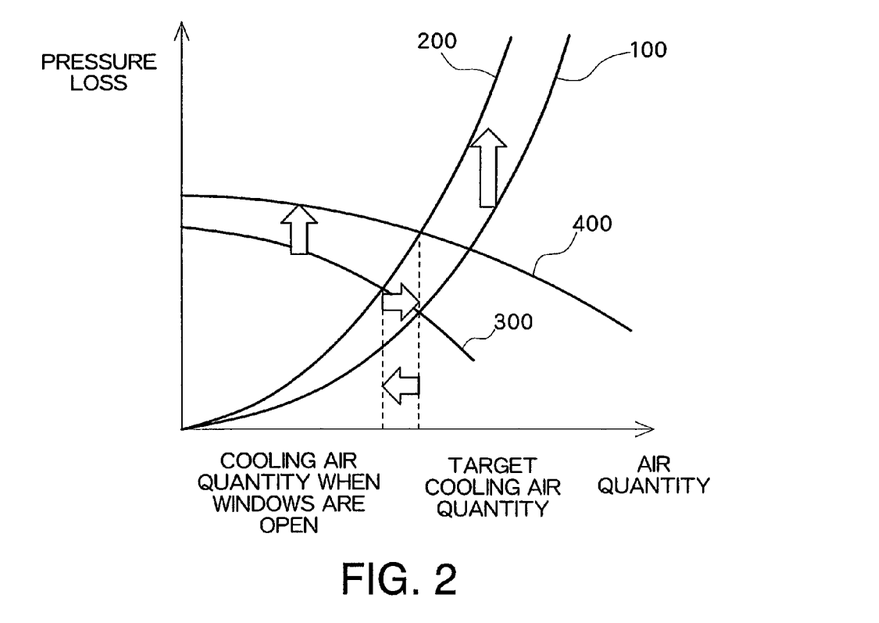
FIG. 2 is a view for explaining cooling fan control according to the embodiment of the present invention.

FIG. 2 illustrates a principle of air quantity control of the cooling fan 62 according to the present embodiment. In FIG. 2, the horizontal axis indicates an air quantity of the cooling fan 62, and the horizontal axis indicates a pressure loss of the cooling path (corresponding to the fan total pressure in FIG. 7). A graph 100 represents a pressure loss when the windows of the vehicle 10 are closed and a graph 200 represents a pressure loss when the windows of the vehicle 10 are opened (completely opened). While the pressure loss increases as the air quantity increases, the pressure loss is further increased by an amount of negative pressure within the vehicle compartment 14 when the windows are opened, compared to when the windows are closed. On the other hand, a graph 300 represents fan performance of the cooling fan 62, which is a characteristic at a basic fan speed v. The basic fan speed (target cooling air quantity) v of the cooling fan 62 is determined by the battery temperature and the ambient temperature. However, when the windows of the vehicle 10 are opened, because the vehicle compartment 14 becomes negative pressure and the pressure loss is increased as illustrated in the graph 200, the air quantity which should be originally obtained at the fan speed v (an air quantity determined by a point of intersection of the graph 100 and the graph 300) is reduced to the air quantity determined by a point of intersection of the graph 200 and the graph 300. Accordingly, in order to obtain the air quantity which should have been originally obtained, the speed of the cooling fan is increased from the speed v to the speed v+Δv. A graph 400 represents performance of the cooling fan 62 when the fan speed is v+Δv. At the point of intersection of the graph 400 and the graph 200, the target cooling air quantity can be obtained, so that the shortage of the air quantity due to the negative pressure can be compensated for. When the target cooling air quantity is represented by Wo and the air quantity obtained at the fan speed v due to the negative pressure is W, the shortage of the air quantity due to the negative pressure ΔW can be represented as ΔW=Wo−W. The controller 11 is capable of increasing the fan speed to a degree which is sufficient for complementing for the shortage of the air quantity ΔW. Obviously, it would not be necessary to increase the fan speed when the shortage of the air quantity ΔW is small. It is therefore preferable to compare the shortage of the air quantity ΔW with a threshold level and then control the fan speed to increase when the shortage of the air quantity ΔW exceeds the threshold level.

Figure 3:
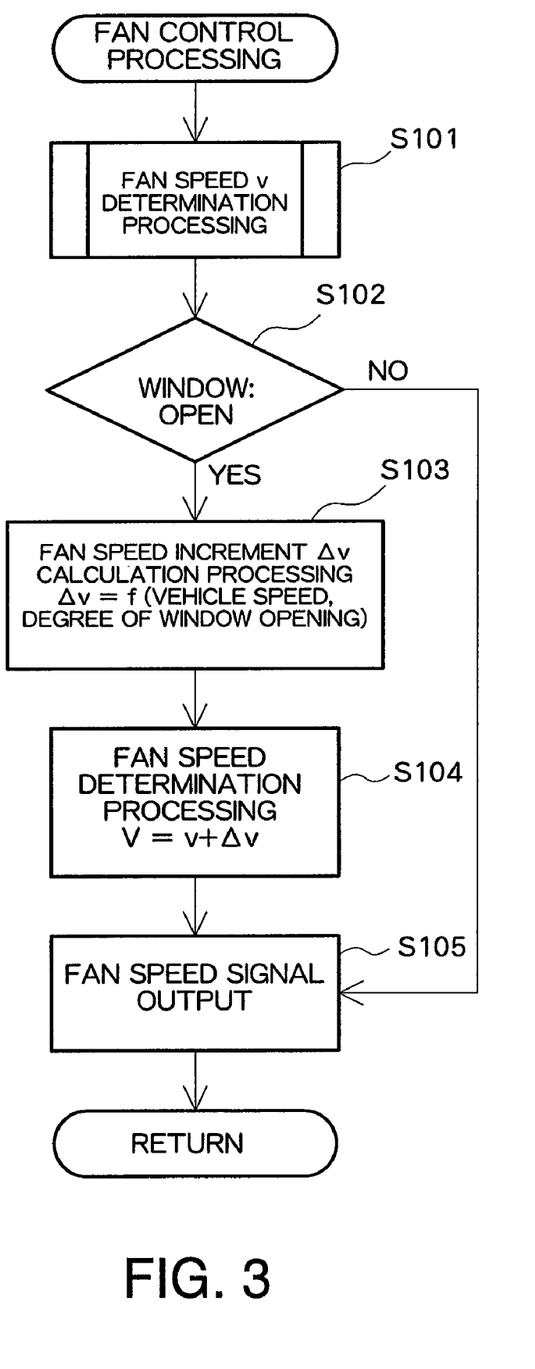
FIG. 3 is a flowchart of processing according to the embodiment of the present invention.

FIG. 3 illustrates a flowchart of fan speed control of the cooling fan 62 performed by the controller 11. First, the controller 11, based on the battery temperature and the ambient temperature, determines the basic fan speed v of the cooling fan 62 (S101). Specifically, the controller 11 determines the basic fan speed v by using a two-dimensional function of the battery temperature and the ambient temperature. Alternatively, the basic fan speed v may be determined using a two-dimensional map obtained by dividing each of the battery temperature and the ambient temperature into a plurality of stages and defining the basic fan speed v corresponding to each stage. Also, the basic fan speed v may be determined only based on the battery temperature. For example, the battery temperature is divided into five stages and the basic fan speed v is previously determined for each stage and stored in a memory of the controller 11. The controller 11 then determines the basic fan speed v corresponding to the stage to which the temperature detected by the temperature sensor belongs with reference to the memory.

The controller then determines whether or not the windows are opened based on a detection signal supplied from a window open/closed sensor installed in the vehicle 10 (S102). The determination result is NO if all the windows of the vehicle 10 are closed, and the determination result is YES if any one of the windows is opened. The controller 11, determining that the windows are opened, calculates an increment Δv of the fan speed (S103). The increment Δv is determined as a two-dimensional function of the vehicle speed and the degree of window opening, i.e. Δv=f (vehicle speed, the degree of window opening).

Figure 4:
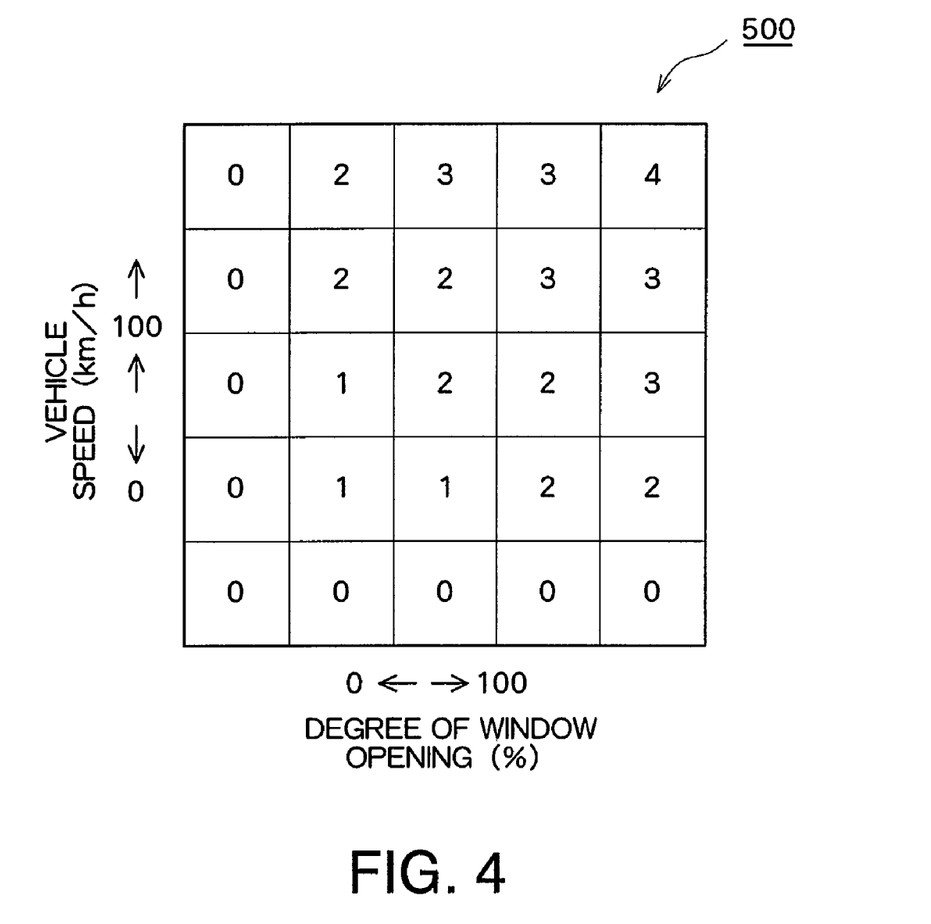
FIG. 4 is an explanatory view of a control map according to the embodiment of the present invention.

FIG. 4 illustrates an example two-dimensional map 500 for determining the increment Δv. This two-dimensional map 500 is previously created and stored in the memory of the controller 11 in advance. The degree of window opening, ranging from 0% to 100%, is divided into five stages, and the vehicle speed, ranging from 0 km/h to 100 km/h, is also divided into five stages. Here, the degree of window opening of 100% corresponds to a case in which all the windows of the vehicle compartment 14 are opened. Then, the level of the increment Δv is defined by five levels, 0 to 4, in accordance with the vehicle speed and the degree of window opening. Here, the numerals 0 to 4 indicate level values in a plurality of stages. Specifically, "0" indicates no increase in the level; "1" indicates an increase of the level by one stage; "2" indicates an increase of the level by two stages; "3" indicates an increase of the level by three stages; and "4" indicates an increase of the level by four stages. For example, assuming that the fan speed of the cooling fan 62 can be changed among seven levels, 0 level to 6 level, and that the current fan speed is 1 level, when the increment Δv is "1", the fan speed is increased by one stage to 2 level, and when the increment Δv is "2", the fan speed is increased by two stages to 3 level. Qualitatively, as the vehicle speed increases, and as the degree of window opening increases, the level of Δv increases. However, even if the vehicle speed increases, Δv remains 0 when the degree of window opening of is 0%, i.e. when the windows are closed. Also, even if the degree of window opening increases, Δv is 0 when the vehicle speed is 0, i.e. when the vehicle is stopped. In either case, Δv is set to 0 when negative pressure is not generated within the vehicle compartment 14.

The increment Δv may be an increment of the duty ratio rather than the level value. For example, "1" may indicate a 1% increase, "2" may indicate a 2% increase, "3" may indicate a 3% increase, and "4" may indicate a 4% increase. Alternatively, assuming that the unit amount of an increase is set to several %, such as 5%, for example, "1" may indicate a 1×5%=5% increase; "2" may indicate a 2×5%=10% increase; "3" may indicate a 3×5%=15% increase; and "4" may indicate a 4×5%=20% increase.

Referring back to FIG. 3, after calculating the increment Δv as described above, the controller 11 determines the fan speed V according to V=v+Δv (S104). The controller 11 then outputs a fan speed signal to the fan motor of the cooling fan 62 (S105).

As described above, according to the present embodiment, with the basic fan speed v of the cooling fan 62 being set based on the battery temperature and the ambient temperature, the increment Δv is determined in accordance with the vehicle speed and the degree of window opening. Then, by adding the increment Δv to the fan speed v to increase the fan speed, a reduction in the air quantity due to the negative pressure which is caused in accordance with the vehicle speed and the degree of window opening can be compensated for to thereby cool the battery 12 in a reliable manner.

While an embodiment of the present invention has been described, the present invention is not limited to the above example and various modifications may be made.

For example, while in the above example, the increment Δv is determined in accordance with the vehicle speed and the degree of window opening, any factors which cause the negative pressure within the vehicle compartment 14 other than the vehicle speed and the degree of window opening, if any, can also be considered. Further, when it is detected that the vehicle compartment 14 is negative pressure from detection of a difference in the pressures between the vehicle compartment 14 and the outside of the vehicle, the increment Δv can be determined in accordance with the degree of this negative pressure. In either case, the fan speed of the cooling fan 62 can be changed in accordance with a degree to which the base pressure of the inlet side static pressure of the cooling fan 62 becomes negative pressure compare to the pressure obtained when the windows are closed.

Figure 5:
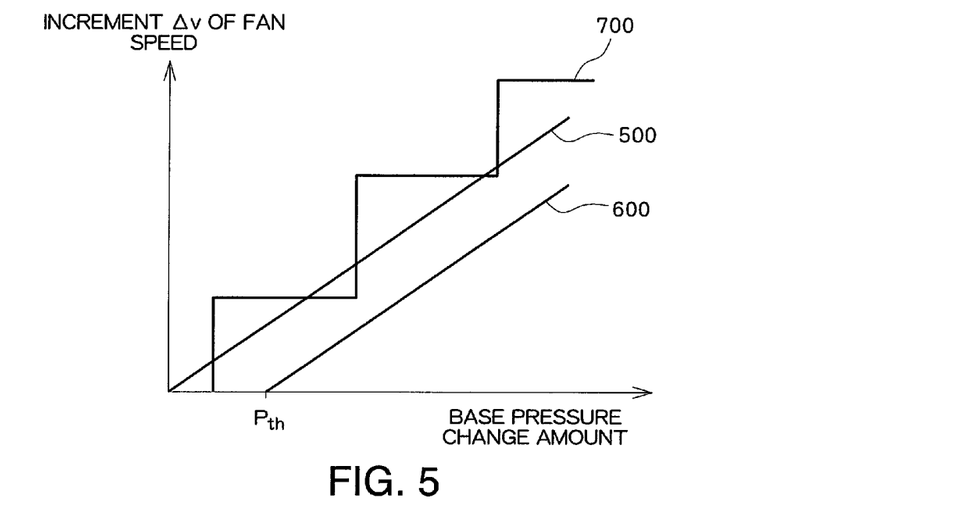
FIG. 5 is a graph illustrating a relationship between a pressure difference and an increment of the fan speed.

FIG. 5 illustrates a relationship between an amount of change of the base pressure of the inlet-side static pressure and the increment Δv of the fan speed when the windows are closed. The greater the amount of change of the base pressure (the greater the absolute value of the negative pressure), the greater the increment Δv of the fan speed. The increment Δv of the fan speed may be increased linearly as shown by a graph 500, or may be 0 until a certain threshold value Pth is reached and then increased linearly thereafter, as shown by a graph 600. Alternatively, the increment Δv of the fan speed may be increased discontinuously stepwise as shown by a graph 700.

Further, while in the above example, the increment Δv is determined as a two-dimensional function of the vehicle speed and the degree of window opening, the increment Δv can be determined more simply. For example, the fan speed may be increased by a predetermined amount or a predetermined ratio only when the vehicle speed is a predetermined threshold value or greater in a case in which the windows of the vehicle are opened. Alternatively, the fan speed may be increased by a predetermined amount or a predetermined ratio only when the vehicle speed is a predetermined threshold value or greater and the degree of window opening is a predetermined threshold or greater.

Also, while in the above example, the fan speed V is determined according to V=v+Δv, the fan speed V may be determined by V=α×v (wherein α is a coefficient of increment and α≧1). Here, the coefficient of increment a can be determined as a two-dimensional function of the vehicle speed and the degree of window opening, similar to the increment Δv.

In addition, while in the above example, the basic fan speed v is determined in accordance with the battery temperature and the ambient temperature, the basic fan speed v may be determined in accordance with physical amounts other than the battery temperature and the ambient temperature.

Further, according to the present embodiment, because the fan speed V is determined by V=v+Δv, even when the basic fan speed v is 0, i.e. it is not necessary to cool the battery 12 by the cooling fan 62, there is a possibility of Δv>0. This is for the purpose of preventing a case in which the air backflows through the cooling path due to the negative pressure, rather than for the purpose of cooling the battery 12 with the air within the vehicle compartment 14.

Also, according to the present embodiment, the greater the vehicle speed and the greater the degree of window opening, the greater the fan speed of the cooling fan 62. This not only provides an advantage that the battery 12 can be reliably cooled but also provides an advantage that it is unlikely that a passenger will notice the noise made by the operation of the cooling fan 62. More specifically, although the operation noise increases as the fan speed of the cooling fan 62 increases, in a situation in which the vehicle speed and the degree of window opening are increased, an engine noise, traveling noise, wind noise, and so on, other than the operation noise of the cooling fan 62, are also increased. In such a situation, it is unlikely that a passenger of the vehicle would notice the increase of the fan speed of the cooling fan 62, leading to an advantage that drivability is not lowered. According to the present embodiment, it is possible to achieve both cooling of the battery 12 and reduction of the sensory noise recognized by a passenger.

Here, according to the present embodiment, in order to further emphasize the reduction in the sensory noise, it is also possible that, after determining the fan speed V according to V=v+Δv, the level of background noise is further evaluated from the vehicle speed and the rotational speed of the engine and so on, so that the fan speed V=v+Δv is finely adjusted based on the level of background noise. For example, when the rotation number of the engine is a predetermined rotational speed or less, the background noise is evaluated to be relatively small, and the fan speed V is reduced by a predetermined amount. (However, the fan speed V after fine adjustment should maintain an air quantity which can compensate for the shortage of the air quantity caused by the negative pressure.) It is further possible to finely adjust the increment Δv, rather than the fan speed V. For example, in the two-dimensional map 500 illustrated in FIG. 4, the level "3" is changed to "2.5" and change the level "4" to "3.5" when the rotational speed of the engine is a predetermined value or less.

While the preferred embodiment of the present invention has been described using specific terms, such description is for illustrative purposes only, and it is to be understood that changes and variations may be made without departing from the spirit or scope of the appended claims.

What is claimed is:

1. A battery cooling system for a vehicle for cooling a battery mounted on a vehicle, the system comprising:
   a cooling fan which supplies air within a vehicle compartment to the battery; and
   a controller which controls a fan speed of the cooling fan, the controller changing the fan speed in accordance with an amount of change of a base pressure of an inlet-side static pressure of the cooling fan.

2. The battery cooling system according to claim 1, wherein
   the controller controls the fan speed such that, when the base pressure of the inlet-side static pressure of the cooling fan is negative pressure compared to that obtained when windows are closed, the fan speed is increased by a greater amount than when the base pressure of the inlet-side static pressure of the cooling fan is not negative pressure compared to that obtained when windows are closed.

3. The battery cooling system according to claim 1, wherein
   the controller changes the fan speed in accordance with a vehicle speed and a degree of window opening of the vehicle.

4. The battery cooling system according to claim 3, wherein
   the controller controls the fan speed of the cooling fan such that as the vehicle speed is increased and as the degree of window opening is increased, the fan speed is increased.

5. The battery cooling system according to claim 3, wherein
   the controller calculates the fan speed by adding an increment Δv of the fan speed in accordance with the vehicle speed and the degree of window opening to a basic fan speed which is determined in accordance with the battery temperature of the battery.

6. The battery cooling system according to claim 1, wherein
   the controller increases the fan speed so as to compensate for shortage of an air quantity of the cooling fan caused by an amount of change of the base pressure of the inlet-side static pressure of the cooling fan.

7. The battery cooling system according to claim 1, wherein
   the controller increases the fan speed when the shortage of an air quantity of the cooling fan caused by an amount of change of the base pressure of the inlet-side static pressure of the cooling fan is compared with a threshold level and exceeds the threshold level.

* * * * *